United States Patent [19]
Broadbent et al.

[11] 3,938,284
[45] Feb. 17, 1976

[54] ROOT CELLAR

[76] Inventors: Lynn C. Broadbent, Box 267, Alpine, Utah 84033; William B. Thomas, 8335 S. 10th East, Sandy, Utah 84070

[22] Filed: Oct. 29, 1974

[21] Appl. No.: 518,465

[52] U.S. Cl. ............... 52/20; 52/219; 98/51; 98/52; 52/169 R
[51] Int. Cl.² .................................... E04H 7/22
[58] Field of Search .......... 52/19, 20, 21, 169, 219, 52/593; 98/51–55; 220/4 C; 206/499, 503, 505, 811, 821; 109/1 S

[56] References Cited
UNITED STATES PATENTS

| 951,192 | 3/1910 | Massey | 52/20 |
|---|---|---|---|
| 1,012,432 | 12/1911 | Prendergast | 52/20 |
| 1,448,307 | 3/1923 | Loop | 98/52 |
| 3,738,070 | 6/1973 | Yarbrough | 52/169 X |

OTHER PUBLICATIONS

"Storage Cellar" Popular Mechanics, Nov. 1944, p. 99 relied upon.

Primary Examiner—J. Karl Bell
Attorney, Agent, or Firm—B. Deon Criddle

[57] ABSTRACT

A pre-built, transportable root cellar having an open bottom, side walls, an insulated top and air vents.

7 Claims, 3 Drawing Figures

ROOT CELLAR

BRIEF DESCRIPTION OF THE INVENTION

1. Field of the Invention

This invention relates to root cellars of the type commonly used to store foods underground.

2. Prior Art

It has long been known that many foods, such as potatoes, onions, carrots, squash, pumpkin, apples, etc., can be maintained in a fresh edible condition if they are stored underground. Consequently, it has been common in the past to dig pits, line them with straw and other materials that will prevent freezing of the foods placed in the pit and to cover them over. Periodically, the pit is opened up and desired quantities of the stored foods are removed. The surrounding earth keeps the foods cool and helps to prevent freezing, and the stored foods can be maintained for rather long periods of time. The loose straw and earth cover allows enough air circulation to keep the foods fresh. In progressing from the use of pits for storage, man has often built structures that are fully or partly underground and that take advantage of the good features of underground storage while eliminating the dirt that may collect on the goods and the difficulties inherent in periodically opening a pit to place or remove foodstuffs. These have usually taken the form of larger buildings, built in place, with brick, rock or wood walls and a fixed air vent system.

SUMMARY OF THE INVENTION

It is an object of the present invention to provide a portable, lightweight, easily installed, pre-built storage cellar, that can be conveniently used by any homeowner.

Other objects are to provide a storage cellar that is impervious to water and electrolytic action and that will provide storage for large quantities of foodstuffs.

Principal features of the invention include an open bottom shell having side walls, a top wall, a raised access opening through the top wall and an insulated cover for the access opening. Vent stacks are provided to provide cross ventilation within the shell, and the vents are preferably made adjustable so that prevailing winds can be utilized to insure adequate air movement.

Preferably, the shell is made with side walls that slope outwardly from the top wall, so that better stability is obtained and for nesting purposes during shipping, and the walls are all insulated to further protect foodstuffs placed in the root cellar against freezing.

Additional objects and features will become apparent from the following detailed description and drawings, disclosing what is presently contemplated as being the best mode of the invention.

THE DRAWINGS

FIG. 1 is a perspective view, taken from slightly above and at one front corner of the root cellar of the invention, and with the closed position of the lid shown in dotted lines.

FIG. 2, a vertical longitudinal section taken on the line 2—2 of FIG. 1, through the vent stacks; and FIG. 3, a vertical transverse section taken on the line 3—3 of FIG. 1, but with the lid shown only in its closed position.

DETAILED DESCRIPTION

Figure 1:
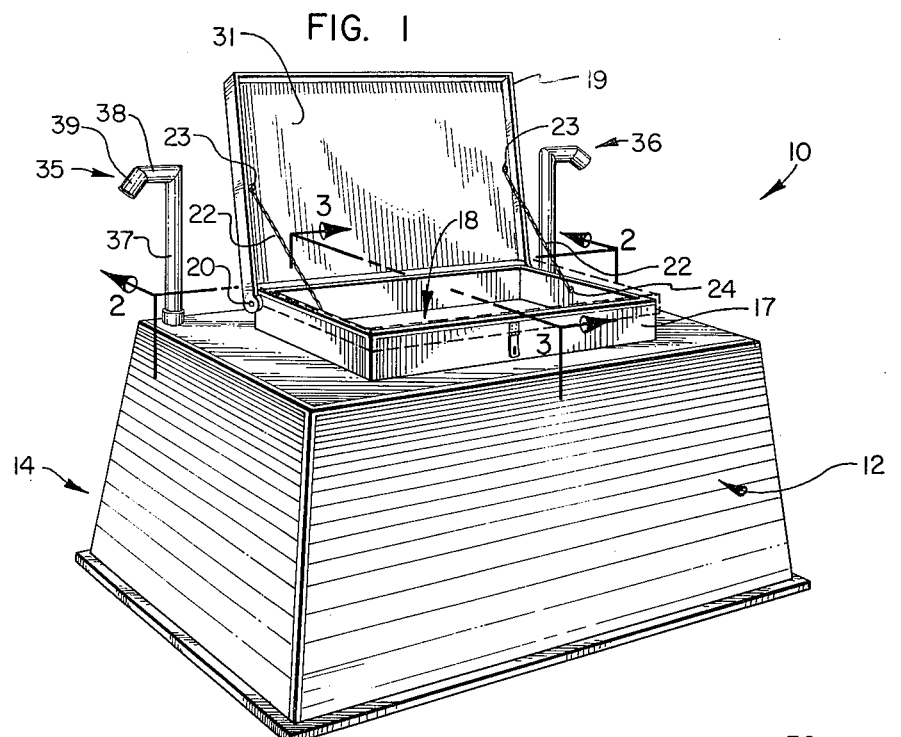
Figure 2:
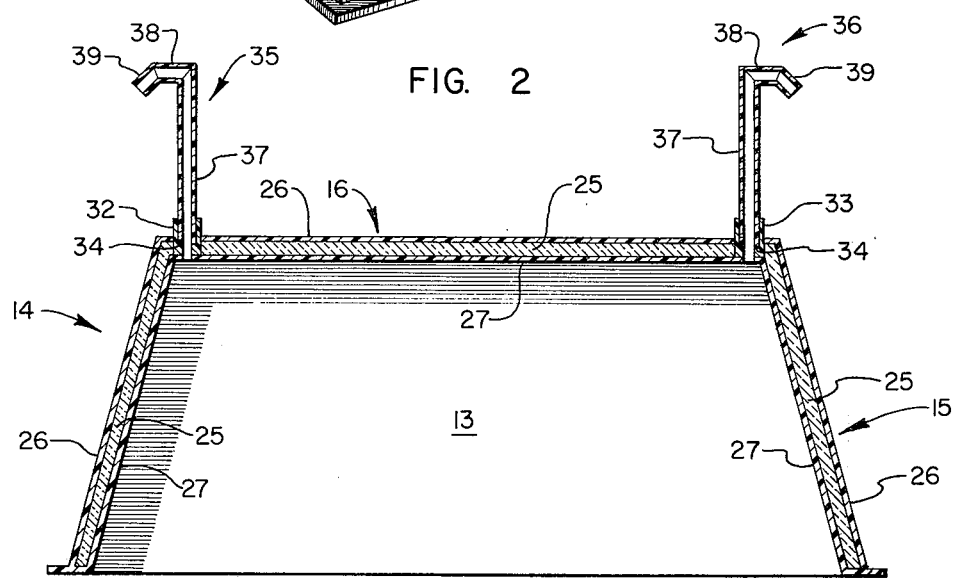
Figure 3:
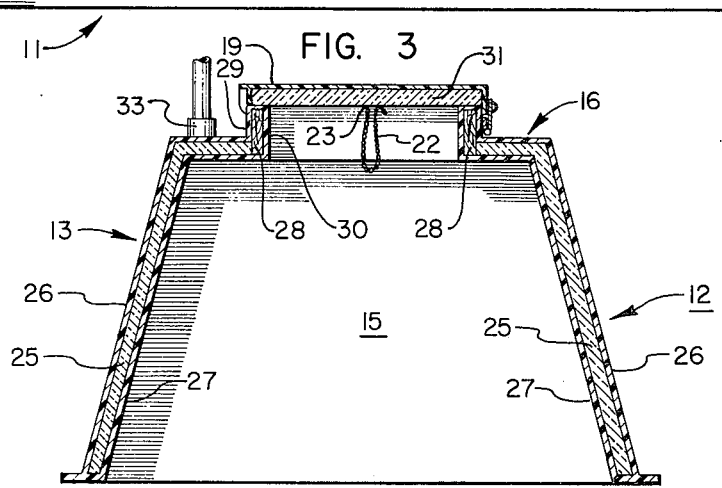

Referring now to the drawings:

In the illustrated preferred embodiment, the root cellar of the invention, shown generally at 10 includes a shell 11 made up of spaced apart front and rear walls 12 and 13, interconnected by spaced apart side walls 14 and 15. The walls 12–15 are all outwardly and downwardly flared with respect to a top wall 16 that interconnects the upper edges of the front, rear and side walls.

A box-like flange 17 surrounds an opening 18 and projects upwardly from the top wall 16, and a lid 19 overlies the flange 17. The lid is pivotally connected at 20 to opposite sides of the flange 17 and flexible chains 22, connected to the lid at 23 and to the flange at 24, allow the lid to be pivoted open, above the flange and to be held in the opened position. The opening 18 is made large enough to allow a person to climb into and out of the shell through the opening.

Each of the front, rear, side and top walls is preferably formed with a core 25 of insulating foam sandwiched between layers 26 and 27 of fiberglass. This construction results in strong, insulated, non-rotting, walls, while holding the weight of the cellar to a minimum, thereby facilitating shipping and handling.

The flange 17 is formed with a strong wood core 28, sandwiched between fiberglass layers 29 and 30 and a layer of insulating material 31 is bonded to the interior of the lid 19 such that it will engage and tightly fit on the flange 17. The flange keeps water from running into the root cellar through opening 18, even when a layer of dirt has been placed over the top wall 16 and around the flange.

Couplings 32 and 33 removably extend through the top wall 16 at rear corners of the root cellar and each coupling has an inwardly extending shoulder 34 at the bottom thereof. Upstanding vent stacks 35 and 36 each have a riser 37 with its lower end tightly fitted through a coupling to rest on a shoulder 34. Each vent stack also has an elbow formed at its upper end, with a portion 38 extending normal to the riser 37 and an outwardly and downwardly extending short leg 39. The short leg 39 preferably projects from the portion 38 at about a forty-five degree angle so that any air movement will be more easily picked up by the stacks. In use, the vent stacks are preferably turned within the couplings 32 and 33 so that one vent stack on the windward side (as determined by the prevailing winds in the area where the root cellar is to be used) is turned to have the short leg extending into the wind. The stack on the leeward side is then turned within its coupling so that the short leg 39 is downwind. With this arrangement, air tends to move into and to be drawn out of the root cellar and good air circulation is maintained. This has been found highly desirable with a cellar such as the present one wherein the cellar walls and lid are impervious to air movement.

The root cellar is positioned by placing it in a hole in the earth large enough to receive the unit and deep enough to allow a layer of earth to be placed on the top wall and such that only the lid will be exposed. The surrounding earth insulates the cellar and holds it at desirable storage temperatures. The insulating pad on the lid further contributes to the temperature stability.

The open bottom of the root cellar allows stored foods to be placed on or proximate to the earth and allows the cellar to achieve an inside temperature comparable to the earth floor that is formed.

The flared configuration of the walls will allow the root cellars to be nested together for storage or transportation after the cellar units have been constructed, and with the air vents removed.

The flared configuration of the walls also adds to the stability of the unit when it is positioned in the ground. The earth piled above the sloping walls helps to hold the unit in place and the sloping walls direct water that may seep through the piled earth outwardly away from the bottom edge of the unit, thus reducing the possibility that water will seep under the walls to accumulate in the cellar.

It has long been recognized that many foods can be stored in a suitable root cellar and these foods can be easily stored for at least several months in the cellar of the invention. Typical foods suitable for storage include potatoes, carrots, cabbage, cauliflower, squash, pumpkin, apples, winter pears, parsnip, sweetpotatoes, celery, onions and tomatoes.

Although a preferred form of our invention has been herein disclosed, it is to be understood that the present disclosure is made by way of example and that variations are possible without departing from the subject matter coming within the scope of the following claims, which subject matter we regard as our invention.

We claim:
1. A pre-built, transportable root cellar comprising
   a top wall having a layer of insulating material formed therein;
   spaced apart front and rear walls interconnected by said top wall and extending downwardly therefrom;
   spaced apart side walls interconnected by said top and front and rear walls whereby said walls form a shell having an open bottom;
   an opening formed through the top wall large enough for a person to pass through;
   a flange surrounding the opening and projecting upwardly from the top wall, said flange including a layer of insulation extending from an inner face of the top wall to the top of the flange;
   a lid pivotally connected to the flange and adapted to be pivoted between an open position overlying the flange and closing the opening, said lid including a layer of insulating material arranged to fully overlie the flange when the lid is in the closed position; and
   air vent means through the top wall.

2. A pre-built, transportable root cellar as in claim 1, wherein the air vent means comprises
   a pair of removable vent stacks extending upwardly from the top wall at the side walls, each said vent stack having an upstanding riser and an elbow at an upper end with a downturned portion thereon.

3. A pre-built, transportable root cellar as in claim 2, further including
   means mounting each of the risers of the vent stacks to be rotatable in the top wall.

4. A pre-built, transportable root cellar as in claim 3, wherein
   the downturned portion of each vent stack extends at an angle of about 45° with respect to the vent stack riser.

5. A pre-built, transportable root cellar as in claim 4 further including
   a layer of insulating material in each of the front, rear, and side walls.

6. A pre-built, transportable root cellar as in claim 5, wherein
   the front, rear and side walls are flared outwardly from the top wall.

7. A pre-built transportable root cellar as in claim 6, wherein
   at least the outer surface of each of the front, rear, side and top walls is constructed of fiberglass.

* * * * *